(12) United States Patent
Wang et al.

(10) Patent No.: US 12,210,114 B2
(45) Date of Patent: Jan. 28, 2025

(54) SYSTEM AND METHOD FOR MUTUAL INTERFERENCE MITIGATION OF FMCW AUTOMOTIVE RADAR

(71) Applicant: Mitsubishi Electric Research Laboratories, Inc., Cambridge, MA (US)

(72) Inventors: Pu Wang, Cambridge, MA (US); Sian Jin, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 496 days.

(21) Appl. No.: 17/655,505

(22) Filed: Mar. 18, 2022

(65) Prior Publication Data
US 2023/0296725 A1 Sep. 21, 2023

(51) Int. Cl.
*G01S 7/02* (2006.01)
*G01S 7/35* (2006.01)

(52) U.S. Cl.
CPC ............ *G01S 7/0232* (2021.05); *G01S 7/354* (2013.01)

(58) Field of Classification Search
CPC .... G01S 13/931; G01S 13/726; G01S 13/343; G01S 7/354; G01S 7/356; G01S 2013/93272; G01S 7/023; G01S 7/0232
See application file for complete search history.

(56) References Cited

U.S. PATENT DOCUMENTS

| | | | |
|---|---|---|---|
| 7,071,868 B2* | 7/2006 | Woodington | H01Q 1/3258 342/159 |
| 11,994,575 B2* | 5/2024 | Rao | G01S 7/35 |
| 2005/0156780 A1* | 7/2005 | Bonthron | G01S 3/48 342/134 |
| 2014/0022113 A1* | 1/2014 | Nogueira-Nine | G01S 13/34 342/128 |
| 2016/0187477 A1* | 6/2016 | Wang | G08B 13/19617 342/146 |
| 2019/0242972 A1* | 8/2019 | Melzer | G01S 13/931 |
| 2020/0191939 A1* | 6/2020 | Wu | G01S 7/354 |
| 2021/0156982 A1* | 5/2021 | Stettiner | G01S 7/35 |
| 2021/0275056 A1* | 9/2021 | Mcmahon | A61B 5/11 |

FOREIGN PATENT DOCUMENTS

DE 102021112175 12/2021

* cited by examiner

*Primary Examiner* — Peter M Bythrow
(74) *Attorney, Agent, or Firm* — Gene Vinokur (57) ABSTRACT

A radar system for tracking an object in a scene by transmitting frequency modulated continuous wave (FMCW) is provided. The radar system is configured to collect radar measurements of the scene sampled in a time-frequency domain within an intermediate frequency (IF) bandwidth to which reflection of the transmitted FMCW is shifted by mixing with a copy of the FMCW, where a frequency dimension of the time-frequency domain is quantized into multiple frequency bins forming the frequency bandwidth, where a time dimension of the time-frequency domain is quantized into multiple time instances forming a time interval corresponding to the PRI, count a number of amplitude peaks of the radar measurements for each frequency bin at different instances of time, identify a number of frequency bins with their counts of the number of peaks above a pre-determined threshold, and determine at least a distance to the object based on frequency analysis of the radar measurements.

24 Claims, 10 Drawing Sheets

SYSTEM AND METHOD FOR MUTUAL INTERFERENCE MITIGATION OF FMCW AUTOMOTIVE RADAR

TECHNICAL FIELD

The present disclosure relates generally to a radar system, and more particularly to the radar system and method for mitigating mutual interference.

BACKGROUND

Intelligent vehicles are equipped with more and more radar sensors for full-view, all-weather perception. New signaling schemes such as phase modulated continuous wave (PMCW) and orthogonal frequency-division multiplexing (OFDM) have been used widely over the traditional frequency modulated continuous wave (FMCW) scheme. However, the PMCW and OFDM operate at significantly higher sampling rates which increase requirements for transceiver hardware in radar systems. Nevertheless, the FMCW scheme remains the mainstream option to achieve full four-dimensional (range-velocity-azimuth-elevation) automotive radar with a sub-degree angular resolution at a mass production level.

However, for the FMCW-based automotive radar operating in the same regulated frequency bands (e.g., 77-81 GHZ), mutual interference of radar signals needs to be addressed. Otherwise, the mutual interference raises the noise floor, jams receiver antennas, triggers false alarms, and causes missing detection. Currently, the MIM is widely performed using fast-time MIM, where the fast-time MIM is performed using techniques such as interference-zeroing, adaptive noise cancellers, and sparse sampling.

The current approach for fast-time MIM exploits the linear chirp feature of the interference and sets detected interferences to zero in a short-time Fourier transform (STFT) domain (also referred to as "STFT-Zeroing"). However, errors in the interference detection and zeroing steps easily propagate to the fast-time domain and it results in strong residuals. This effect becomes worse when the low-resolution STFT is used, as the current approaches focus on nulling the mutual interference signals.

Therefore, there is a need of a system that can perform fast-time MIM that minimizes the residuals by focusing directly on fast-time target signals.

SUMMARY

Accordingly, it is an objective of some embodiments to provide a radar system and a method that directly retrieves the fast-time target signals.

To that end, the radar system is configured to transmit FMCW towards an object (also referred to as "target") in a scene and receive FMCW reflected from the object, where based on the reflected FMCW, the radar system is configured to detect the object in the scene. In some embodiments, the radar system is configured to track the object in the scene. To that end, the same detection may be performed for multiple objects in the scene.

To that end, the radar system is configured to generate a fast-time-frequency (fTF) representation of the scene and directly recover fast-time target signals via a direct fTF mode retrieval (fTFMR), where the fTF representation of the scene comprises target ridges corresponding to the object and interference ridges corresponding to one or multiple interference signals.

Accordingly, it is also an objective of some embodiment of the present disclosure to identify weaker target ridges among significantly stronger interference ridges that spread linearly over the fTF representation and to enable high-precision fTFMR that maps the identified target-inclusive fTF representation into fast-time samples.

To that end, high-resolution fTF representation, robust ridge detection using sequential pulses, and direct fTFMR are cascaded.

Some embodiments are based on the realization that the high-resolution fTF representation enables higher-degree separation between target signals and interference signals in the fTF representation. The high-resolution fTF representation is particularly important to the case that interference beat frequency crosses over that of a target signal. To this end, a frequency reassignment-based Fourier synchrosqueezing transform (FSST) is used that enables high-resolution fTF representation.

In some embodiments, a ridge detection mechanism is used to detect the target ridges from the fTF representation of the scene. The proposed ridge detection exploits the fact that a target signature over the fTF domain is consistent over multiple pulses of the FMCW, while an interference signature is highly likely to vary due to a non-coherent nature between the interfering and victim radars. This results in a robust ridge detection of underwhelmed two-way attenuated target signals among one-way attenuated interferences.

Some embodiments are based on the realization that the fTFMR is guaranteed to converge to the target signal in fast-time intervals with sufficient separation between the target and interference in the fTF domain. As the FSST highly focuses on sinusoidal-like target signals, the fTFMR can directly recover target signals in the time-domain by integrating the fTR representation over the target-only region and, at the same time, filtering out interference and noise.

Accordingly, one embodiment of the present disclosure provides a radar system for tracking an object in a scene by transmitting frequency modulated continuous wave (FMCW) in a radio frequency (RF) band over a sequence of pulse repetition intervals (PRI), the radar system comprising: a processor; and a memory having instructions stored thereon that, when executed by the processor, cause the radar system to: collect radar measurements of the scene sampled in a time-frequency domain within an intermediate frequency (IF) bandwidth to which reflection of the transmitted FMCW is shifted by mixing with a copy of the FMCW, wherein a frequency dimension of the time-frequency domain is quantized into multiple frequency bins forming the frequency bandwidth, wherein a time dimension of the time-frequency domain is quantized into multiple time instances forming a time interval corresponding to the PRI; count a number of amplitude peaks of the radar measurements for each frequency bin at different instances of time within each PRI; identify a number of frequency bins with their counts of the number of peaks above a pre-determined threshold; and determine at least a distance to the object based on frequency analysis of the radar measurements within the identified frequency bins while ignoring radar measurements at most of the other frequency bins within the frequency bandwidth.

Accordingly, one embodiment of the present disclosure provides a method for tracking an object in a scene by transmitting frequency modulated continuous wave (FMCW) in a radio frequency (RF) band over a sequence of pulse repetition intervals (PRI), the method comprising: collecting radar measurements of the scene sampled in a time-frequency domain within an intermediate frequency (IF) bandwidth to which reflection of the transmitted FMCW is shifted by mixing with a copy of the FMCW, wherein a frequency dimension of the time-frequency domain is quantized into multiple frequency bins forming the frequency bandwidth, wherein a time dimension of the time-frequency domain is quantized into multiple time instances forming a time interval corresponding to the PRI; counting a number of amplitude peaks of the radar measurements for each frequency bin at different instances of time within each PRI; identifying a number of frequency bins with their counts of the number of peaks above a pre-determined threshold; and determining at least a distance to the object based on frequency analysis of the radar measurements within the identified frequency bin while ignoring radar measurements at most of the other frequency bins within the frequency bandwidth.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
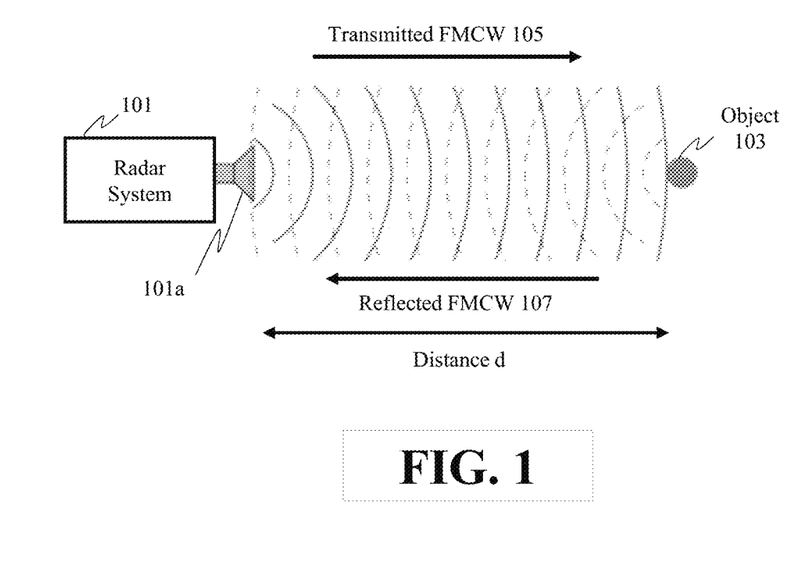
FIG. 1 illustrates an FMCW automotive radar system configured to track an object using FMCW, in accordance with an example embodiment of the present disclosure.

FIG. 1 illustrates an FMCW automotive radar system 101 configured to track an object 103 using FMCW, in accordance with an example embodiment of the present disclosure. The FMCW automotive radar system (also referred to as "radar system") 101 comprises a transceiver 101a configured to transmit 105 FMCW in a radio frequency (RF) band over a sequence of pulse repetition intervals (PRI) to detect the object 103, where the object 103 may be located at a distance d from the radar system 101. The transmitted FMCW 105 is reflected by the object 103, where the reflected FMCW 107 is received by the transceiver 101a. The reflected FMCW 107 is analyzed by the radar system 101 to track the object 103 in the scene.

In some embodiments, the radar system 101 may comprise a transmitter to transmit 105 the FMCW and a receiver to receive the reflected 107 FMCW. The radar system 101 is configured to sample radar measurements of the scene in a time-frequency domain and collect the sample radar measurements of the scene within an intermediate frequency (IF) bandwidth. The radar system 101 quantizes a frequency dimension of the time-frequency domain into multiple frequency bins forming the frequency bandwidth. Similarly, the radar system 101 quantizes a time dimension of the time-frequency domain into multiple time instances forming a time interval corresponding to the PRI.

Based on the quantized time and frequency domain, the radar system 101 counts the number of amplitude peaks of the radar measurements for each frequency bin at different instances of time, where each amplitude peak of the number of amplitude peaks corresponds to maximum energy within each frequency bin at a specific instance of time. The radar system 101 is further configured to identify a number of frequency bins with their count of the number of peaks above a pre-determined threshold and further, configured to determine at least the distance, a velocity, or a combination thereof for the object 103 based on frequency analysis of the radar measurements within the identified frequency bins while ignoring radar measurements at most of the other frequency bins within the frequency bandwidth.

The radar system 101 may be able to perform the same measurements for multiple objects in the scene by using a different FMCW for each of the multiple objects, and performing corresponding detection described above for each object.

Figure 2:
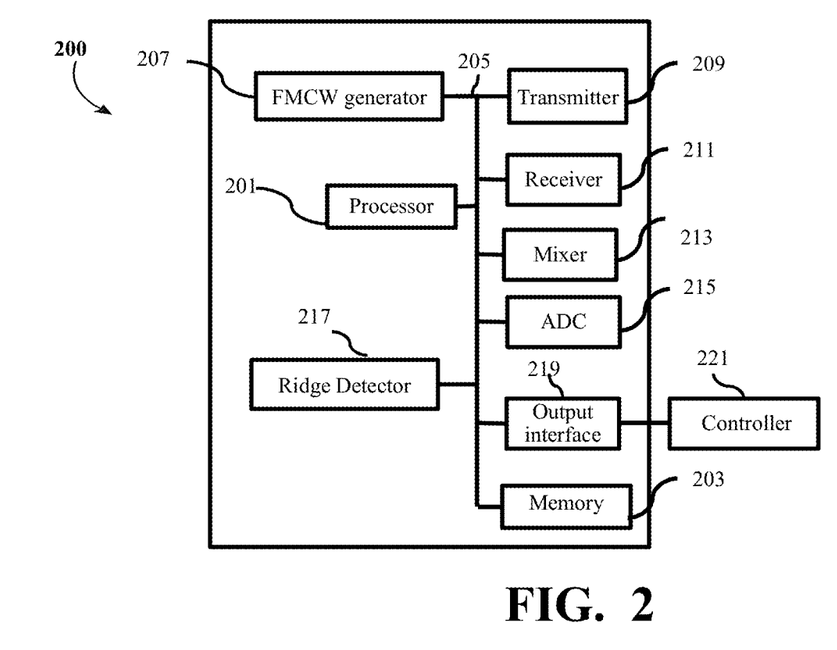
FIG. 2 illustrates a block diagram of the radar system for tracking the object, in accordance with an example embodiment.

FIG. 2 illustrates a block diagram 200 of the radar system 101 for tracking the object 103, in accordance with an example embodiment. The radar system 101 includes a processor 201 configured to execute stored instructions. The radar system 101 further comprises a memory 203 that stores instructions that are executable by the processor 201. The processor 201 can be a single core processor, a multi-core processor, a computing cluster, or any number of other configurations. The memory 203 can include random access memory (RAM), read only memory (ROM), flash memory, or any other suitable memory systems. The processor 201 is connected through a bus 205 to one or more input and output devices. Further, the radar system 101 includes an FMCW generator 207, where the FMCW generator 207 is configured to generate FMCW over the sequence of PRI. The radar system 101 further comprises a transmitter 209 configured to transmit 105 the FMCW over the sequence of PRIs.

The radar system 101 comprises a receiver 211 configured to receive incoming signals within an RF bandwidth. The incoming signals include a delayed FMCW reflected 107 from the object 103, and one or multiple interference signals. The incoming signals are provided to a mixer 213, where the mixer 213 is configured to mix the incoming signals with the copy of the FMCW to shift the incoming signals into the IF bandwidth, such that a sequence of peak amplitudes at different time instances of a target beat signal formed by mixing the copy of the FMCW with a coherent incoming signal forms a ridge falling within a frequency bin, while a sequence of peak amplitudes at different time instances of an interference beat signal formed by mixing the copy of the FMCW with an incoherent incoming signal crosses multiple frequency bins at an angle, such that an output of the mixer 213 includes a combination of the target beat signal and one or multiple interference beat signals. The mixer 213 may comprise a local oscillator using which the mixer 213 converts the RF band FMCW signals into IF band. The combination of the target beat signal and one or multiple interference beat signals are required to be sampled in fast time to obtain the fTF representation of a scene comprising the object 103.

To that end, the processor 201 is configured to use an analog-to-digital converter (ADC) 215. The ADC 215 is configured to sample the output of the mixer in fast time to produce the radar measurements providing the fTF representation of the scene. Based on the fTF representation obtained from the ADC 215, the processor 201 is further configured to generate a high-resolution fTF representation of the scene by using a frequency reassignment-based Fourier synchrosqueezing transform (FSST). The high-resolution fTF representation of the scene comprises target ridges corresponding to the object 103 and interference ridges corresponding to the one or multiple interference signals. The interference ridges are stronger than the target ridges.

Some embodiments are based on the realization that the high-resolution fTF representation enables higher degree of separation between the target ridges and the inference ridges. To detect the target ridges, the radar system 101 comprises a ridge detector 217. The ridge detector 217 is configured to sequentially detect the strongest signal ridge in the fTF representation. The radar system 101 stores a count of the number of peaks corresponding to detect ridge signals in each pulse of multiple pulses of the FMCW within each PRI.

Additionally, the radar system 101 may include an output interface 219. In some embodiments, the radar system 101 is further configured to submit, via the output interface 219, a sequence of control forces to a controller 221, where the control forces are generated based on the detection of the object 103. The controller 221 may be configured to control a load such as a self-driving vehicle installed with the radar system 101, based on the sequence of control forces.

Mathematical Implementation:
Target and Interference Signal Model

Figure 3A:
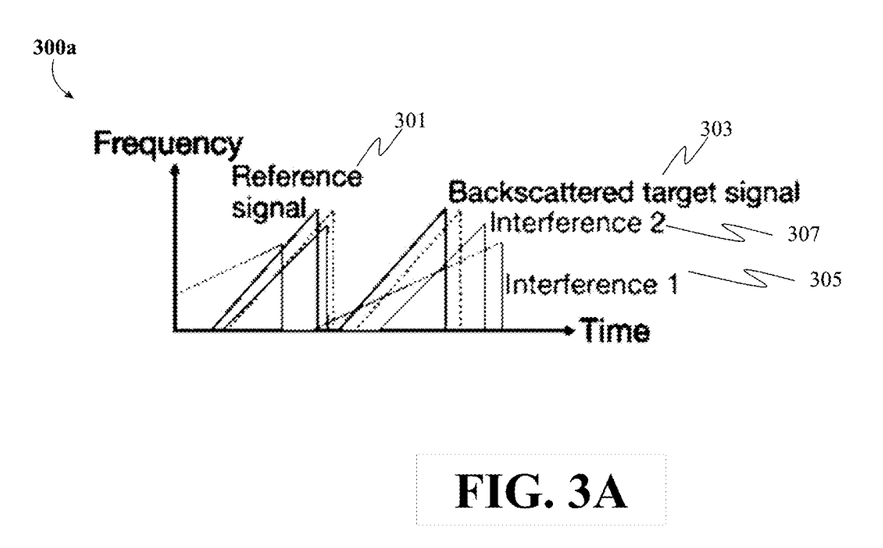
FIG. 3A illustrates time-frequency domain FMCW radar interferences over multiple pulses in RF band, in accordance with an example embodiment.

FIG. 3A illustrates time-frequency domain FMCW radar interferences over multiple pulses in RF band 300a, in accordance with an example embodiment. For ease of describing only two FMCW pulses are shown in FIG. 3A. FIG. 3A illustrates two pulses corresponding to a reference signal 301 and corresponding two pulses of backscattered target signal 303. The reference signal 301 corresponds to transmitted FMCW 105 to detect the object 103, and the backscattered target signal 303 corresponds to the reflected FMCW 107. As illustrated in FIG. 3A, the FMCW is affected by two interfering pulses: interference 1 305 and interference 2 307.

Assuming the FMCW-based automotive radar 101, sub-indexed by u, transmits a sequence of chirp pulses (i.e., the reference signal 301) with a carrier frequency modulated at the RF bands and the PRI $\tilde{T}_u$:

$$x_u^{RF}(T) = a_u^{RF} e^{j2\pi(f_0 t + 0.5 h_u t^2)}, \forall \in [0, T_u] \quad (1)$$

where $a_u^{RF}$ is the RF amplitude, $f_0$ is the central frequency, $h_u$ is the chirp rate, $T_u$ is the chirp sweep duration, and $\tilde{T}_u$-$T_u$ is the inter-pulse idle duration. Without loss of generality, all automotive radars operate at the same central frequency $f_0$, e.g., $f_0$=77 GHZ, but with different chirp sweep duration $T_u$, PRI $\tilde{T}_u$, and chirp rate $h_u$.

In the following mathematical implementation, the FMCW-based automotive radar 101 is a victim radar, where the victim radar is referred to as the radar 0, i.e., u=0. For the l-th chirp pulse, the dechirped signal of the victim radar is a multi-component signal:

$$x_l(T) = x_l^o(T) + x_l^i(T) = \sum_{k=1}^{K^o} x_{l,k}^o(t) + \sum_{k=1}^{K^o} x_{l,u}^i(t) \quad (2)$$

where $x_l^o(t)$ consists of $K^o$ target components, and $x_l^i(t)$ is the sum of $U_l^i$ interference components. In some embodiments, the number of interferences $U_l^i$ may vary over the pulse.

An expression for the target component $x_{l,k}^o(t)$, can be derived by multiplying the attenuated and delayed copy (i.e., the backscattered target signal 303) with the transmitted 105 FMCW (i.e., the reference signal 301) in equation (1) at a local oscillator $$x_{l,k}^o(t) = a_k^o e^{j2\pi \phi_{l,k}^o(t)}, \forall \in [0, T_0] \quad (3)$$

where $a_k^o$ is the IF amplitude of target k, and the phase term is given as:

$$\phi_{l,k}^o = (f_{r,k}^o + f_{D,k}^o)t + f_{D,k}^o(l-1)T_o \quad (4)$$

with $f_{r,k}^o$ and $f_{D,k}^o$ denoting the beat frequency and, respectively, the Doppler frequency of the k-th target.

On the other hand, the interference components (305 and 307) may or may not be dechirped into the IF band of the victim radar, depending on FMCW configurations between the victim radar $\{f_0, h_0, T_0, \tilde{T}_0\}$ and the u-th interfering radar $\{f_0, h_u, T_u, \tilde{T}_u\}$ as well as their relative time offset at l-th chirp cycle $\tau_{u,l}$.

Figure 3B:
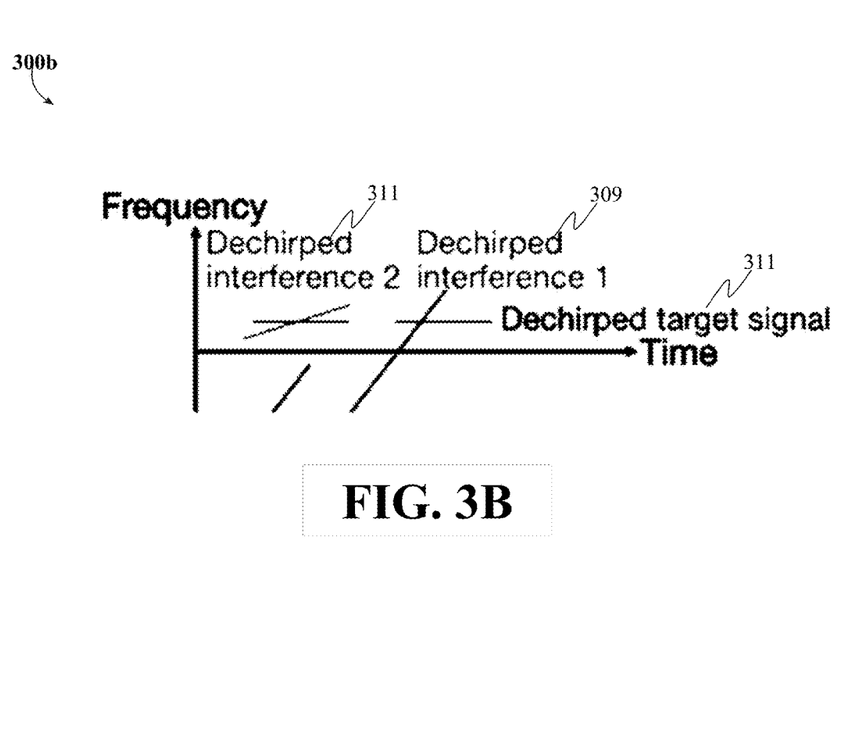
FIG. 3B illustrates time-frequency domain FMCW radar interferences over multiple pulses in IF band, in accordance with an example embodiment.

FIG. 3B illustrates time-frequency domain FMCW radar interferences over multiple pulses in IF band 300b, in accordance with an example embodiment. The IF band 300b comprises a first deciphered interference (also referred to as "deciphered interference 1") 309 corresponding to interference component 305 and a second deciphered interference (also referred to as "deciphered interference 2") 311 corresponding to interference component 307 along with the deciphered target signal 313. Assuming that the u-th interference at the l-th pulse turns out to be a chirp signal $$x_{l,u}^i(T) = a_u^i e^{j2\pi\phi_{l,u}^i}(t) \forall\, t \in T_{l,u}^i \quad (5)$$

where $a_u^i$ is the IF amplitude of interference u, the phase term is given as:

$$\phi_{l,u}^i = 0.5(h_u \tau_{u,l} - f_{D,u}^i)t + \phi_{l,u,0}^i \quad (6)$$

with $f_{D,u}^i$ denoting the Doppler frequency of interference u and $\phi_{l,u,o}^i$ denoting initial phase difference between interferer radar and victim radar at the l-th pulse, and $T_{l,u}^i$ denotes the contaminated fast-time interval of the l-th pulse due to the u-th interference $$T_{l,u}^i = \{t \,|\, (h_u - h_u)t - (h_{u\tau_{u,l}} - f_{D,u}^i)| \le f_L\} \quad (7)$$

which is determined from the fact that the interference signal $x_{l,u}^i(t)$ must lie in the IF band of the victim radar with IF bandwidth $f_L$.

II. Interference Mitigation Method

It is an objective of some embodiments to reconstruct $x_l^o(t)$ from $x_l(t)$. This is achieved by separating the targets from the interferences in the fTF domain via high-resolution time-frequency tools, identifying the target ridge by utilizing the consistent patterns of the target and varying patterns of the interferences, and directly reconstructing target signals via the fTFMR.

High-Resolution Fast-Time-Frequency (fTF) Representation

For the l-th pulse, the fast-time samples of the received signal $x_l(t)$ can be transformed to the fTF representation $X_l(t,\omega)$ via standard time-frequency analysis such as the STFT. The radar system 101 is configured to use the FSST that highly focuses on the target pattern and allows fTFMR, and directly reconstruct the fast-time target signals from the focused target portions of the fTF representation with limited inclusion of interference and noise.

The FSST can be considered as a frequency-domain reassignment of the STFT. Given the STFT of $x_l(t)$:

$$V_{x_l}^g(t,\omega) = \int_R x_l(\tau) g^*(\tau - t) e^{-i\omega\tau} d\tau, \quad (8)$$

where g(t) is the time-domain window function, (.)* denotes the complex conjugate, and w is the frequency variable, its centroid (local energy) of the spectrogram, i.e., $$|V_{x_l}^g(t,\omega)|^2$$

is computed as:

$$\hat{\omega}_{x_l}(t,\omega) = \omega - \mathcal{J}\left\{\frac{V_{x_l}^{g'}(t,\omega)}{V_{x_l}^g(t,\omega)}\right\}, \quad (9)$$

where $$V_{x_l}^{g'}(t,\omega)$$

denotes the STFT with the window function given by the derivative of g(t), and $\mathcal{J}\{\cdot\}$ takes the imaginary part of the input. The FSST reassigns the STFT from the point of computation to its centroid along the frequency ($\omega$) domain over each fast-time instant t:

$$X_l(t,\omega) = \frac{\int_R V_{x_l}^0(t,v) e^{i\omega t} \delta(\omega - \hat{\omega}_{xl}(t,v)) dv}{2\pi g^*(0)}, \quad (10)$$

where $\delta(.)$ denotes the Dirac function. The FSST-based fTFR is highly focused on sinusoid-like target signals

B. Robust Ridge Detection of Underwhelmed Targets

Some embodiments are based on the realization that reconstructing the target signal $$x_l^o(t) = a_{l,k}^o e^{j2\pi\phi_{l,k}^o(t)}$$

requires separating it from interferences and other target signals. This is done by detecting its ridge $$\Omega_{l,k}^o(t)$$

in the fTF domain, i.e., the estimation of its instantaneous frequency $d\phi_{i,k}^o(t)/dt$.

Figure 4A:
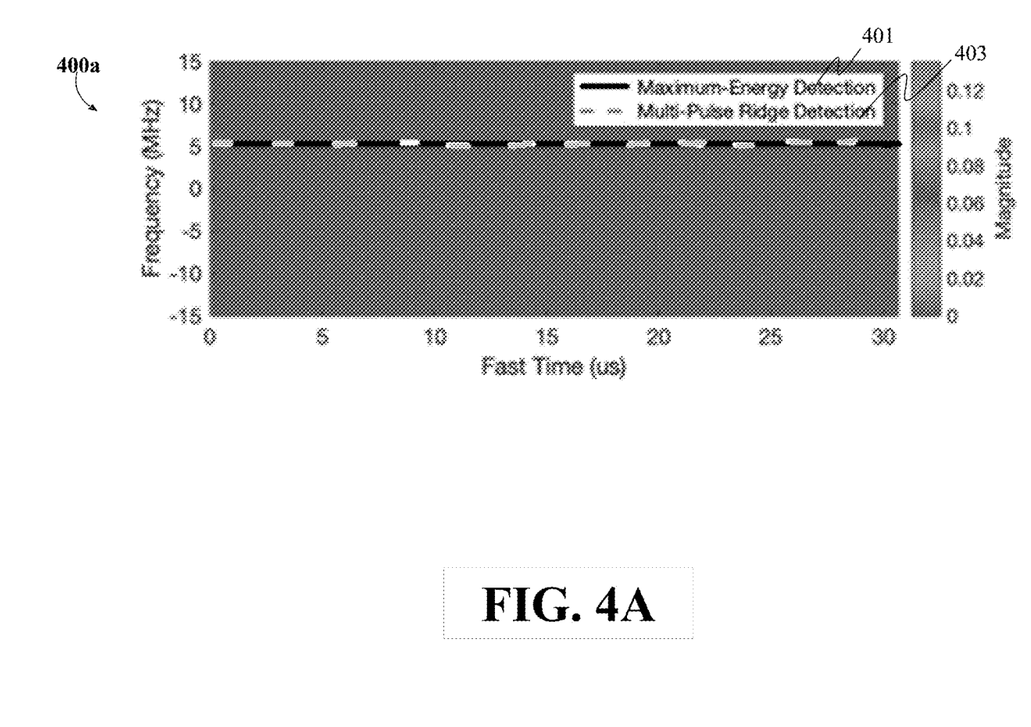
FIG. 4A illustrates a ridge detection in an fTF representation of a pulse comprising only target signal, in accordance with an example embodiment.

FIG. 4A illustrates a ridge detection in an fTF representation 400a of a pulse comprising only target signal, in accordance with an example embodiment. The frequency dimension of the time-frequency domain in the fTF representation 400a is quantized into multiple frequency bins (for example, from −15 MHz-15 MHz, where each frequency bin is of size 5 MHz) forming the frequency bandwidth, and a time dimension of the time-frequency domain in the fTF representation 400a is quantized into multiple time instances forming a time interval corresponding to the PRI (for example, from 0 µs to 30 µs, where each time interval or time bin is of size 5 µs).

Further, as illustrated in FIG. 4A, the target is a single-tone signal 401 (as shown in equation (4)), the target ridge $$\Omega_{l,k}^o(t)$$

403 is a constant function of t and is a straight line in the fTF representation 400a. The target ridge $$\Omega_{l,k}^o(t)$$

403 stays the same over the multiple pulses within a coherent processing interval (CPI). The radar system 101 is configured to count the number of amplitude peaks of the radar measurements in the fTF representation 400a for each frequency bin at different instances of time.

Figure 4B:
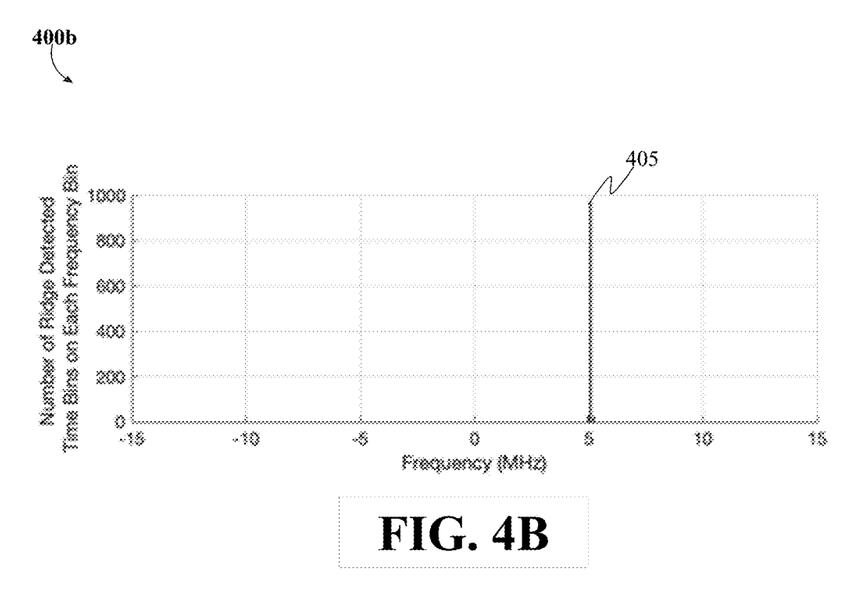
FIG. 4B illustrates a histogram for the number of amplitude peaks in frequency bins of the fTF representation, in accordance with an example embodiment.

In some embodiments, the radar system 101 is configured to plot a histogram for the number of amplitude peaks in each frequency bin. FIG. 4B illustrates a histogram 400b for the number of amplitude peaks 405 in frequency bins of the fTF representation 400a, in accordance with an example embodiment. FIG. 4B is described below in conjunction with FIG. 4A. The histogram 400b comprises frequency in the unit of MHz on the X-axis and the number of ridges detected and time bins on each frequency bin on the Y-axis. As the target ridge $$\Omega_{l,k}^o(t)$$

stays the same over the multiple pulses within the CPI as illustrated in FIG. 4A, the number of amplitude peaks (or ridges) 405 are accumulated at the base band frequency i.e., 5 MHz of the target signal.

Figure 5A:
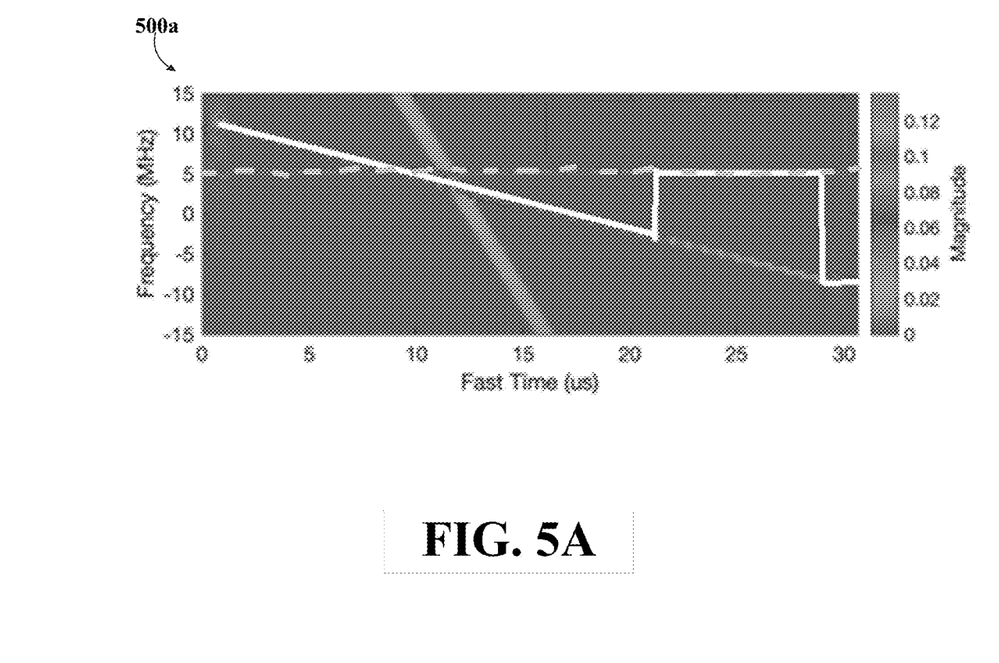
FIG. 5A illustrates a ridge detection in an fTF representation of a pulse comprising one target signal and two interference signal, in accordance with an example embodiment.

FIG. 5A illustrates a ridge detection in an fTF representation 500a of a pulse comprising one target signal and two interference signals, in accordance with an example embodiment. Maximum energy 501 is detected as per the plot representation 500a. The time-frequency dimension of the fTF representation 500a is quantized like that of the fTF representation 400a. As illustrated in FIG. 5A, a target ridge 503 stays the same over multiple pulses within the CPI while the FMCW interference ridges (corresponding to the maximum energy detection 501) are likely to vary over multiple pulses due to the non-coherence between the interfering and victim radars.

Figure 5B:
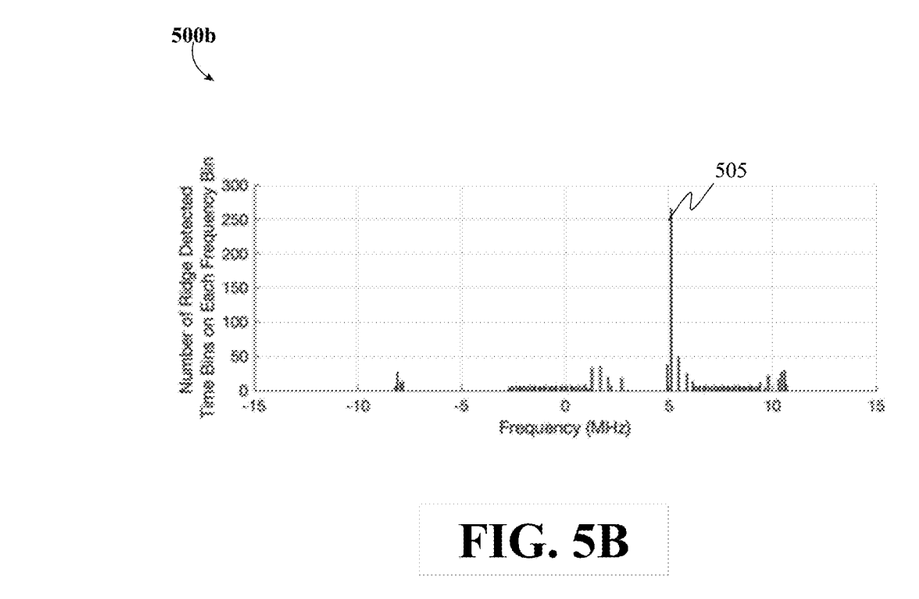
FIG. 5B illustrates a histogram for the number of amplitude peaks in frequency bins of the fTF representation, in accordance with an example embodiment.

FIG. 5B illustrates a histogram 500b for the number of amplitude peaks in frequency bins of the fTF representation 500a, in accordance with an example embodiment. FIG. 5B is described below in conjunction with FIG. 5A. As the target ridge stays the same over the multiple pulses within the CPI while the FMCW interference ridges vary over multiple pulses, the number of amplitude peaks (or ridges) 505 that gets accumulated at the beat frequency, i.e., 5 MHz, of the target signal is still significantly larger than the number of amplitude ridges at any other frequency.

Figure 6:
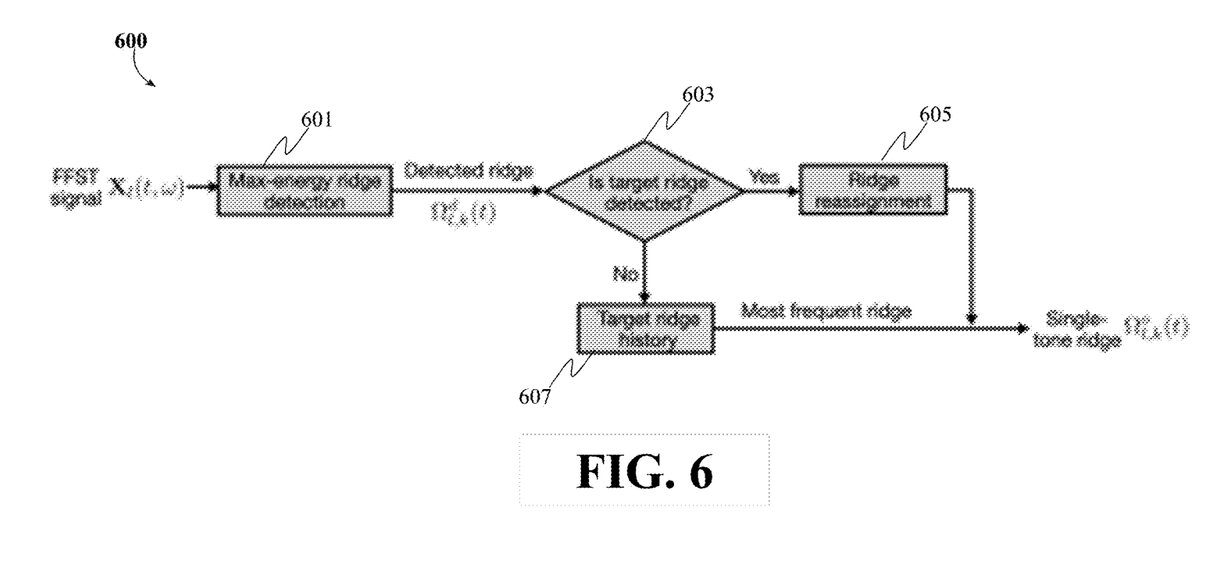
FIG. 6 illustrates a flow diagram of multi-pulse ridge detection method, in accordance with an example embodiment.

In some embodiments, to detect the target ridges from the fTF representation (for example, 500a) a multi-pulse ridge detection method is used. FIG. 6 illustrates a flow diagram 600 of multi-pulse ridge detection method, in accordance with an example embodiment. At step 601, a maximum energy ridge detection is performed on an input FFST $X_l(t,\omega)$ to detect target ridge $$\Omega_{l,k}^d(t).$$

To that end, the multi-pulse ridge detection is performed using a maximum-energy ridge detector that uses a penalized forward-backward greedy algorithm to sequentially detect the strongest signal ridge. The detected target ridges may be a mixture of target and interferences.

At step 603, it is validated whether the detected ridges correspond to the target ridges from other pulses in the same CPI if necessary. The detected ridges are validated by checking if:

$$\sum_{n=1}^{N} 1\left(\Omega_{l,k}^d(n\Delta T) = \text{mode}\left(\{\Omega_{l,k}^d(n\Delta T), n = 1, \ldots, N\}\right)\right) > N^{TH}, \quad (11)$$

where N is the number of time bins in the fTF domain, $\Delta T$ is the time resolution of fTF such that $N\Delta T=T_0$, mode (.) means the value that appears the most often in a set of values, $N^{TH}$ is a threshold.

If the target ridge, at step 605, is reassigned to be a constant function over the fast time with the beat frequency equal to the most frequent bin of the detected ridge:

$$\Omega_{l,k}^o(t) = \text{mode}\left(\{\Omega_{l,k}^d(n\Delta T), n = 1, \ldots, N\}\right). \quad (12)$$

Alternatively, if the target ridge is not detected, at step 607, the history of the most frequent ridge over multiple pulses in the same CPI are used and assign the most frequent ridge in the pulse l, $$\Omega_{l,k}^o(t) = \text{mode}\left(\{\Omega_{l',k}^o(t), l' = [1, \ldots, L]\setminus\{l\}\}\right), \quad (13)$$

where L is the number of pulses in a CPI. For instance, as illustrated in FIG. 5A, the detected ridge $$\Omega_{l,k}^d(t)$$

fails to pass the validation of equation (11) and the target ridge is re-assigned by looking into the target ridges from other pulses.

C. Fast-Time-Frequency Mode Retrieval of Targets

Finally, to directly reconstruct the target signal $x_l^o(t)$ from its fTF representation $X_l(t,\omega)$ and the detected target ridges $$\Omega_{l,k}^o(t),$$

k=1, 2, . . . , $K^o$. In some embodiments, to avoid in interference component on the target ridge $$\Omega_{l,k}^o(t),$$

the tTFMR uses the interference-free portion along the detected ridges:

$$\hat{X}_{l,k}(t, \omega) = \begin{cases} X_l(t, \omega), & t \in \hat{\mathcal{T}}_{l,k}^o(\omega), |\omega - \Omega_{l,k}^o(t)| < \epsilon, \\ 0, & \text{otherwise}, \end{cases}$$

where $$\hat{\mathcal{T}}_{l,k}^o(\omega)$$

is the estimated interference-free portion of the target ridge k. Then, the fTFMR directly integrates $\hat{X}_{l,k}(t,\omega)$ over a small frequency interval around $$\Omega_{l,k}^o(t):$$

$$\hat{x}_{l,k}^{o}(t) = \frac{1}{g(0)} \int_{|\omega - \Omega_{l,k}^{o}(t)| < \epsilon} \hat{X}_{l,k}(t, \omega) d\omega, \quad (14)$$

where $\hat{x}_{l,k}^{o}(t)$ is the reconstructed fast-time signal of target k. To obtain $$\hat{T}_{l,k}^{o}(\omega),$$

the interfered portion on $$X_l(\omega) \triangleq \{|X_l(n\Delta T, \omega)|^2, n = 1, 2, \ldots, N\}$$

for each frequency bin satisfying $$\{\omega : |\omega - \Omega_{l,k}^{o}(t)| < \epsilon\}$$

using the median absolute deviation (MAD) detector. The MAD detector estimates the interference portion $$o \in O_{l,k}$$

if $$\left\| |X_l(o\Delta T, \omega)|^2 - \text{median}(X_l(\omega)) \right\| > \gamma^{MAD} \underset{i=1,2,\ldots,N}{\text{median}} \left( \left\| |X_l(i\Delta T, \omega)|^2 - \text{median}(X_l(\omega)) \right\| \right),$$

Then, the interference-free portion is estimated as $$\hat{T}_{l,k}^{MAD}(\omega) = \bigcup_{o \in \{1,2,\ldots,N\} \setminus O_{l,k}} [(o-1)\Delta T, o\Delta T]. \quad (15)$$

In some embodiments, to retain the target portion as much as possible, each element in $$\{|X_l(n\Delta T, \omega)|^2, n = 1, \ldots, N\}$$

with the power profile of target k, i.e., $$\mathcal{P}_{l,k} = \{|X_{l'}(n\Delta T, \omega)|^2, n = 1, \ldots, N, l' = 1, \ldots, l-1\},$$

and determine the set of time bins corresponding to target k $$Q_{l,k} = \{q : |X_l(q\Delta T, \omega)|^2 < \gamma^{His} \text{median}(\mathcal{P}_{l,k})\}, \quad (16)$$

where $$\gamma^{His}$$

is the target detection threshold or a pre-determined threshold in the power profile. Then, the interference-free portion of the target k is estimated as $$\hat{T}_{l,k}^{His}(\omega) = \bigcup_{q \in Q_{l,k}} [(q-1)\Delta T, q\Delta T]. \quad (17)$$

On combining equation (15) and (17), and obtain the estimated interference-free portion for target k as:

$$\hat{T}_{l,k}^{o}(\omega) = \hat{T}_{l,k}^{MAD}(\omega) \cup \hat{T}_{l,k}^{His}(\omega). \quad (18)$$

where $$\hat{T}_{l,k}^{o}(\omega)$$

as the true interference-free time region of the target k on frequency.

Figure 7:
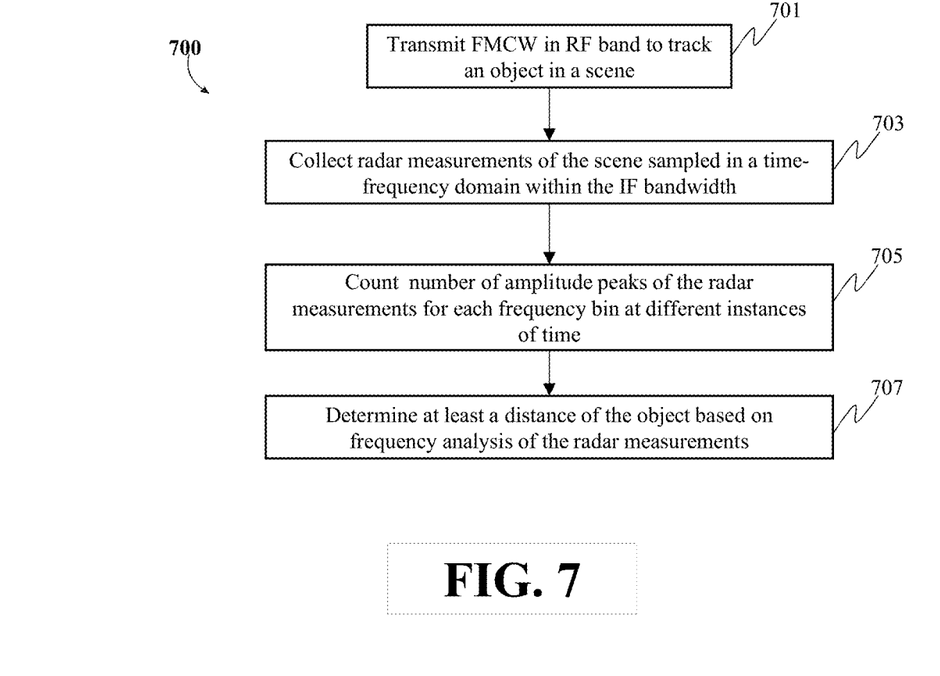
FIG. 7 illustrates steps of a method for tracking an object, in accordance with an example embodiment.

FIG. 7 illustrates steps of a method 700 for tracking an object, in accordance with an example embodiment. The method 700 is executed by the radar system 101. At step 701, FMCW in RF band is transmitted over a sequence of pulse repetition intervals (PRI) to detect the object 103, where the object 103 may be located at a distance d from the radar system 101. The transmitted FMCW 105 is reflected by the object 103, where the reflected FMCW 107 is received by the radar system 101 and is analyzed by the radar system 101 to track the object 103 in the scene.

At step 703, radar measurements of the scene sampled in a time-frequency domain within the IF bandwidth to which reflection of the transmitted FMCW is shifted by mixing with a copy of the FMCW may be collected. A frequency dimension of the time-frequency domain is quantized into multiple frequency bins forming the frequency bandwidth. Similarly, a time dimension of the time-frequency domain is quantized into multiple time instances forming a time interval corresponding to the PRI.

At step 705, the number of amplitude peaks of the radar measurements for each frequency bin at different instances of time may be counted. Each peak of the number of amplitude peaks corresponds to maximum energy within each frequency bin at a specific instance of time. At step 707, the number of frequency bins with their number of peaks above the predetermined threshold is identified.

At step 707, at least a distance to the object 103, is determined, based on frequency analysis of the radar measurements within the identified frequency bin while ignoring radar measurements at most of the other frequency bins within the frequency bandwidth.

Embodiments

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A radar system for tracking an object in a scene by transmitting frequency modulated continuous wave (FMCW) in a radio frequency (RF) band over a sequence of pulse repetition intervals (PRI), the radar system comprising:
   a processor; and a memory having instructions stored thereon that, when executed by the processor, cause the radar system to:
      collect radar measurements of the scene sampled in a time-frequency domain within an intermediate frequency (IF) bandwidth to which reflection of the transmitted FMCW is shifted by mixing with a copy of the FMCW, wherein a frequency dimension of the time-frequency domain is quantized into multiple frequency bins forming the frequency bandwidth, wherein a time dimension of the time-frequency domain is quantized into multiple time instances forming a time interval corresponding to the PRI;
      count a number of amplitude peaks of the radar measurements for each frequency bin at different instances of time within each PRI;
      identify a number of frequency bins with their counts of the number of peaks above a pre-determined threshold; and
      determine at least a distance to the object based on frequency analysis of the radar measurements within the identified frequency bins while ignoring radar measurements at most of the other frequency bins within the frequency bandwidth.

2. The radar system of claim 1, wherein each amplitude peak of the number of amplitude peaks corresponds to maximum energy within each frequency bin at a specific instance of time.

3. The radar system of claim 1, further comprising:
   a transmitter configured to transmit the FMCW over the sequence of PRIs;
   a receiver configured to receive incoming signals within an RF bandwidth, the incoming signals including a delayed FMCW reflected from the object, and one or multiple interference signals;
   a mixer configured to mix the incoming signals with the copy of the FMCW to shift the incoming signals into the IF bandwidth, such that a sequence of peak amplitudes at different time instances of a target beat signal formed by mixing the copy of the FMCW with a coherent incoming signal forms a ridge falling within a frequency bin, while a sequence of peak amplitudes at different time instances of an interference beat signal formed by mixing the copy of the FMCW with an incoherent incoming signal crosses multiple frequency bins at an angle, such that an output of the mixer includes a combination of the target beat signal and one or multiple interference beat signals; and
   an analog-to-digital converter (ADC) configured to sample the output of the mixer in a fast time to produce the radar measurements providing a fast-time-frequency (fTF) representation over each PRI of the scene.

4. The radar system of claim 3, wherein the processor is further configured to transform the fast-time samples within each PRI to the fast-time-frequency representation.

5. The radar system of claim 3, wherein the processor is further configured to identify the number of frequency bins with their counts of the number of peaks above the predetermined threshold for multiple objects.

6. The radar system of claim 3, wherein the processor is further configured to
reconstruct interference-mitigated fast-time samples from the fast-time-frequency representation confined at each of the identified frequency bins over each PRI; and
group the interference-mitigated fast-time samples from the same frequency bin over all PRIs.

7. The radar system of claim 6, wherein the processor is further configured to identify distance, velocity, or a combination thereof, of the object by processing the grouped interference-mitigated samples.

8. The radar system of claim 3, wherein the processor is further configured to:
obtain the fTF representation of the scene from the ADC; and
generate a high-resolution fTF representation of the scene by using a frequency reassignment-based Fourier synchrosqueezing transform (FSST), wherein the high-resolution fTF representation of the scene comprises target ridges corresponding to the object and interference ridges corresponding to the one or multiple interference signals, and wherein the interference ridges are stronger than the target ridges.

9. The radar system of claim 8, wherein the processor is further configured to use a multi-pulse ridge detection mechanism to detect the weaker target ridges from the stronger interference ridges at each pulse of multiple pulses of the FMCW.

10. The radar system of claim 9, wherein the multi-pulse ridge detection mechanism is implemented using a maximum-energy ridge detector, and wherein the maximum-energy ridge detector is configured to use a penalized forward-backward greedy algorithm to sequentially detect the strongest signal ridge.

11. The radar system of claim 9, wherein the processor is configured to determine that a ridge detected by the multi-pulse ridge detection corresponds to a target ridge when the detected ridge remains constant over the multiple pulses, of the FMCW, within a coherent processing interval (CPI), and wherein the CPI indicates a group of multiple pulses of the FMCW with the same pulse repetition frequency (PRF) and frequency.

12. The radar system of claim 11, wherein the processor is further configured to reconstruct fast-time target signals, corresponding to the object, from the high-resolution fTF representation and the detected target ridges via a direct fTF mode retrieval (fTFMR).

13. The radar system of claim 1, wherein the processor is configured to maintain an identifier of a current frequency bin with the maximum count of the number of peaks over multiple PRIs and switch the identifier to a next frequency bin when a count of the number of peaks falling within the next frequency bin within a predetermined number of time intervals is greater than a count of the number of peaks falling within the current frequency bin.

14. The radar system of claim 13, wherein the processor is configured to switch the identifier when a difference between the count of the number of peaks falling within the next frequency bin and the count of the number of peaks falling within the current frequency bin is greater than a threshold.

15. A method for tracking an object in a scene by transmitting frequency modulated continuous wave (FMCW) in a radio frequency (RF) band over a sequence of pulse repetition intervals (PRI), the method comprising:

collecting radar measurements of the scene sampled in a time-frequency domain within an intermediate frequency (IF) bandwidth to which reflection of the transmitted FMCW is shifted by mixing with a copy of the FMCW, wherein a frequency dimension of the time-frequency domain is quantized into multiple frequency bins forming the frequency bandwidth, wherein a time dimension of the time-frequency domain is quantized into multiple time instances forming a time interval corresponding to the PRI;
counting a number of amplitude peaks of the radar measurements for each frequency bin at different instances of time within each PRI;
identifying a number of frequency bins with their counts of the number of peaks above a pre-determined threshold; and
determining at least a distance to the object based on frequency analysis of the radar measurements within the identified frequency bin while ignoring radar measurements at most of the other frequency bins within the frequency bandwidth.

16. The method of claim 15, wherein each amplitude peak of the number of amplitude peaks corresponds to maximum energy within each frequency bin at a specific instance of time.

17. The method of claim 15, further comprising:
transmitting, using a transmitter, the FMCW over the sequence of PRIs;
receiving, using a receiver, incoming signals within an RF bandwidth, the incoming signals including a delayed FMCW reflected from the object, and one or multiple interference signals;
mixing, using a mixer, the incoming signals with the copy of the FMCW to shift the incoming signals into the IF bandwidth, such that a sequence of peak amplitudes at different time instances of a target beat signal formed by mixing the copy of the FMCW with a coherent incoming signal forms a ridge falling within a frequency bin, while a sequence of peak amplitudes at different time instances of an interference beat signal formed by mixing the copy of the FMCW with an incoherent incoming signal crosses multiple frequency bins at an angle, such that an output of the mixer includes a combination of the target beat signal and one or multiple interference beat signals; and
sampling, using an analog-to-digital converter (ADC), the output of the mixer in a fast time to produce the radar measurements providing a fast-time-frequency (fTF) representation over each PRI of the scene.

18. The method of claim 17, wherein the method further comprises:
obtaining the fTF representation of the scene from the ADC; and
generating a high-resolution fTF representation of the scene by using a frequency reassignment-based Fourier synchrosqueezing transform (FSST), wherein the high-resolution fTF representation of the scene comprises target ridges corresponding to the object and interference ridges corresponding to the one or multiple interference signals, and wherein the interference ridges are stronger than the target ridges.

19. The method of claim 18, wherein the method further comprises using a multi-pulse ridge detection mechanism to detect the weaker target ridges from the stronger interference ridges at each pulse of multiple pulses of the FMCW.

20. The method of claim 19, wherein the multi-pulse ridge detection mechanism is implemented using a maximum-energy ridge detector, and wherein the maximum-energy ridge detector uses a penalized forward-backward greedy algorithm to sequentially detect the strongest signal ridge.

21. The method of claim 19, wherein the further comprises determining that a ridge detected by the multi-pulse ridge detection corresponds to a target ridge when the detected ridge remains constant over the multiple pulses, of the FMCW, within a coherent processing interval (CPI), and wherein the CPI indicates a group of multiple pulses of the FMCW with the same pulse repetition frequency (PRF) and frequency.

22. The method of claim 21, wherein the method further comprises reconstructing fast-time target signals, corresponding to the object, from the high-resolution fTF representation and the detected target ridges via a direct fTF mode retrieval (fTFMR).

23. The method of claim 15, wherein the method further comprises maintaining an identifier of a current frequency bin with the maximum count of the number of peaks over multiple PRIs and switch the identifier to a next frequency bin when a count of the number of peaks falling within the next frequency bin within a predetermined number of time intervals is greater than a count of the number of peaks falling within the current frequency bin.

24. The method of claim 23, wherein the method further comprises switching the identifier when a difference between the count of the number of peaks falling within the next frequency bin and the count of the number of peaks falling within the current frequency bin is greater than a threshold.

* * * * *